United States Patent [19]

Leverance et al.

[11] Patent Number: 4,639,902
[45] Date of Patent: Jan. 27, 1987

[54] NEAR ULTRASONIC PATTERN COMPARISON INTRUSION DETECTOR

[75] Inventors: Robert A. Leverance, College Park; Socrates A. Longas, Glenndale, both of Md.

[73] Assignee: The United States of America as represented by the Secretary of the Navy, Washington, D.C.

[21] Appl. No.: 748,366

[22] Filed: Jun. 24, 1985

[51] Int. Cl.[4] .............................................. G08B 13/16
[52] U.S. Cl. ..................................... 367/93; 340/552; 342/5
[58] Field of Search .......................... 367/93; 340/552; 343/5 PD

[56] References Cited

U.S. PATENT DOCUMENTS 4,242,743 12/1980 Salem ..................................... 367/93
4,382,291 5/1983 Nakauchi ............................. 367/93
4,499,564 2/1985 Sirai ..................................... 367/93
4,512,000 4/1985 Masako ................................ 367/93

Primary Examiner—Glen R. Swann, III
Attorney, Agent, or Firm—Kenneth E. Walden; Frederick A. Wein; John G. Wynn

[57] ABSTRACT

An intrusion detector is configured to transmit signal(s) of a very short duration and then process the returned signal(s) reflected from various surfaces and objects within the propagation path in a room to be secured. The return signal(s) is a succession of peaks whose return times represent the location of respective objects. As configured, the intrusion detector apparatus includes, inter alia, a microprocessor that stores processed facsimiles of the return signal(s) for an unoccupied room and continually makes comparisons with subsequent returned signal(s). When the returned signal(s) changes, as a result of an unauthorized entry into the room, for example, a visual and/or audible alarm indication is produced.

11 Claims, 10 Drawing Figures

NEAR ULTRASONIC PATTERN COMPARISON INTRUSION DETECTOR

BACKGROUND OF THE INVENTION

1. Field of the Invention

The present invention relates to surveillance systems and methods in general, but more specifically, it relates to an improved surveillance system and method using gated-oscillations for the transmitted signal(s), and microprocessor processing of the returned signal(s).

2. Description of the Prior Art

Except in a few elaborate installations, active ultrasonic intrusion detectors are usually continuously transmitting devices. When a continuous signal is transmitted, the returned or received signal(s) is a complex sum of the many reflections of the transmitted signal(s). Under steady-state conditions, the returned signal is a composite that is a sinusoidally variant when the transmitted signal(s) is sinusoidal. The maximum amplitude of the composite will depend upon the location of the receiver, the frequency of the transmitted signal(s), the position of the room furnishings, the location of personnel within the room as well as the amplitude, i.e., power of the transmitted signal(s). If there is a strong background noise situation, due to air currents or other sources, the continuously transmitting type of active ultrasonic detector apparatus, whether it is of the composite maximum amplitude or doppler shift variety, will experience operational difficulties that are manifested in the form of a substantial number of false alarms.

In order to overcome problems like the foregoing, some prior art systems have used pulse-like transmitted signals alone or in combination with doppler shift techniques. In a doppler shift system, the frequency of the reflected signal(s) increases when an object or person approaches the detector, and the frequency of the reflected signal(s) decreases when an object or person moves away. In certain types of situations, the foregoing general type systems operate with a high degree of reliability and in other situations they do not.

The prior art, as indicated hereinabove, includes advances in ultrasonic intrusion detector apparatuses and methods. However, insofar as can be determined, no prior art intrusion detector apparatus or method incorporates all of the features and advantages of the present invention.

OBJECTS OF THE INVENTION

Accordingly, a principal object of the present invention is to use quasi-ultrasonic reflections, in an improved manner, to detect an unauthorized entry in a room to be secured.

Another object of the present invention is to store a facsimile of the return signal(s) for an unoccupied room and continually compare it with subsequent returned signal(s) in an improved manner.

Yet another object of the present invention is to configure an interior detector apparatus to function successfully when there is strong background noise, in an improved manner.

Still another object of the present invention is to eliminated the deleterious effects of air currents on the stability of the propagation medium without using doppler shift techniques or reducing the sensitivity of the intrusion detector apparatus.

A further object of the present invention is to carry out the foregoing objects by choosing the transmitted signal(s) to be an oscillation of very short duration so that the received signal(s) is largely composed of primary reflections from the objects in the room to be secured nearest thereto.

An additional object of the present invention is to minimize multiple reflections and/or reverberations by limiting the receiving period following the generation of each of the transmitted signal(s).

SUMMARY OF THE INVENTION

The primary purpose of the present invention is to use quasi-ultrasonic reflections to detect an unauthorized entry in the presence of personnel in a room to be secured, in an improved manner.

The essence of the present invention is in the use of amplitude variations alone, rather than frequency variations, in the detection process to successfully detect the presence of an intruder, even when there is strong background noise, by, inter alia, reducing the transmitted signal(s) to a gated oscillation of a very short duration.

The purpose of the present invention is carried by configuring the intrusion detector apparatus to transmit signal(s), i.e., oscillations for a very short duration, so that the returned signal(s) is largely composed of the primary reflections from nearby objects in the room under surveillance. Noise, from multiple reflections or reverberations, is further minimized by limiting the receiving the period following the transmission of each pulse or transmitted signal(s). The pulse is actually generated by a sinusoidal oscillator operating at a predetermined frequency in coaction with a pulse control unit. The returned signal(s) is filtered to eliminate most of the background noise, and then processed to determine whether an intrusion has taken place.

BRIEF DESCRIPTION OF THE DRAWINGS

The foregoing, other objects, novel features and advantages of the present invention will be more apparent from the following more, particular description of a preferred embodiment as illustrated in the accompanying drawings, in which.

DESCRIPTION OF THE PREFERRED EMBODIMENT

Figure 1:
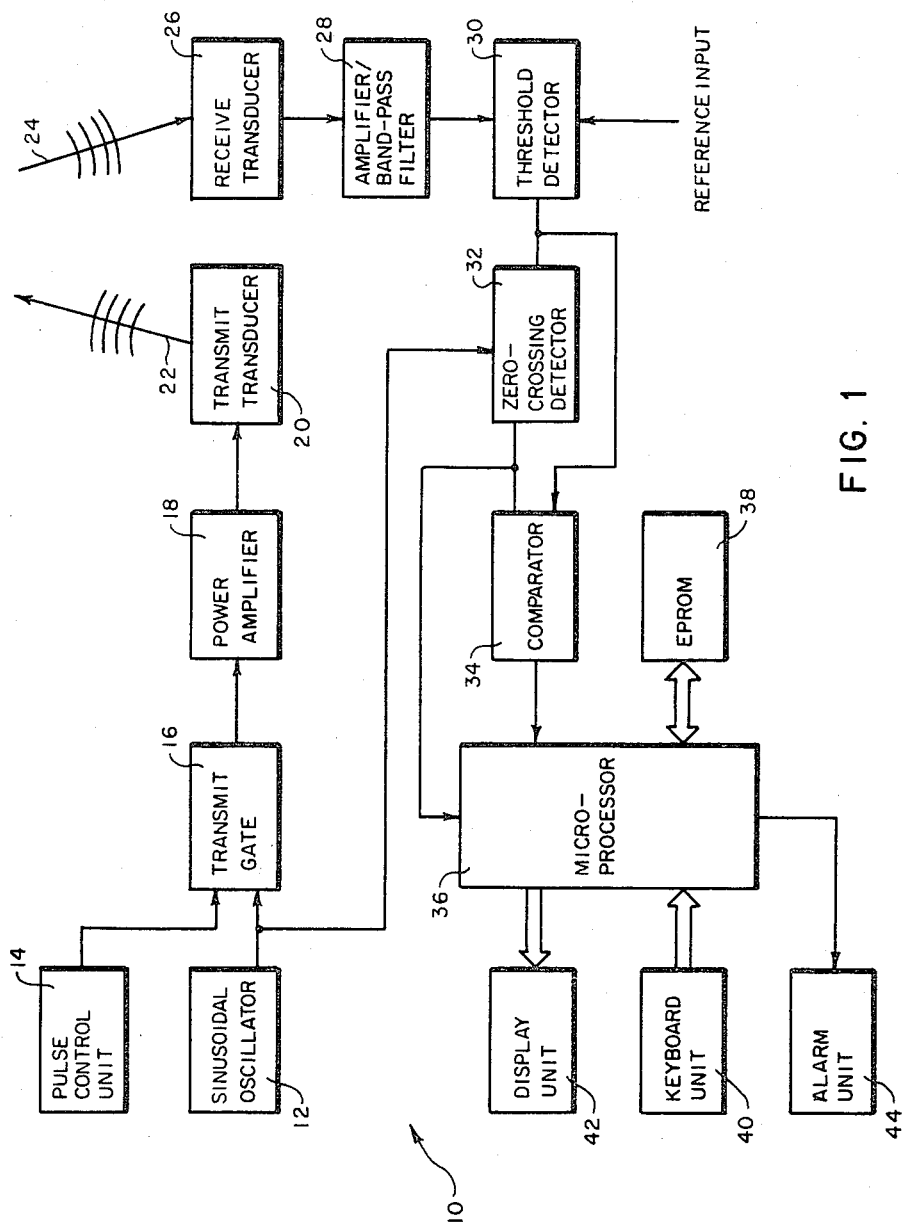
FIG. 1 is a block diagram representation of an intrusion detector apparatus incorporating the present invention.

FIG. 1 is a block diagram of an intrusion detector apparatus 10 in which the present invention is employed to detect, in an improved manner, an unauthorized entry into a room to be secured. The intrusion detector apparatus 10 comprises a sinusoidal oscillator 12 and a pulse control unit 14 which both drive a transmit gate 16 to produce a gated sinusoidal signal at its output. The transmit gate 16 is connected to a power amplifier 18 which amplifies the gated sinusoidal signal and feeds it to a transducer 20. In turn, the transducer 20 outputs a transmitted signal(s) 22 (quasi-ultrasonic or sound waves) into the room to be secured (not shown).

To continue, a received or returned signal(s) 24 (also quasi-ultrasonic or sound waves), which is a composite of the many reflections of the transmitted signal(s) 22 in the room to be secured, impinges on a receive transducer 26 which converts it to an electrical signal(s) facsimile sufficient to drive an amplifier/band-pass filter 28, where the returned signal(s) are amplified and filtered to remove most of the background noise. The conditioned signal(s) is then fed to, at its signal input, a threshold detector 30 which is set to a predetermined reference level at its reference input. The output of the threshold detector 30 drives both a zero-crossing detector 32 and one input of a comparator 34. The other input of the comparator 34 is driven by the output of the zero-crossing detector 32. The sinusoidal oscillator 12, aforementioned, also feeds another input of the zero-crossing detector 32, thereby providing the sinusoidal signal necessary for it to function properly. The output of the comparator 34 is fed to a microprocessor 36 which operates on the output from the comparator 34 according to a predetermined operational program stored in an electrically programmable read only memory (EPROM) 38. A keyboard unit 40 for initiating operation of the intrusion detector apparatus 10, a display unit 42 for displaying facsimile of the actual intrusions and/or errors, for analysis, and an alarm unit 44 for sounding an alarm signal when there is an intrusion, are also operatively connected to the microprocessor 36.

STATEMENT OF THE OPERATION

Figure 2:
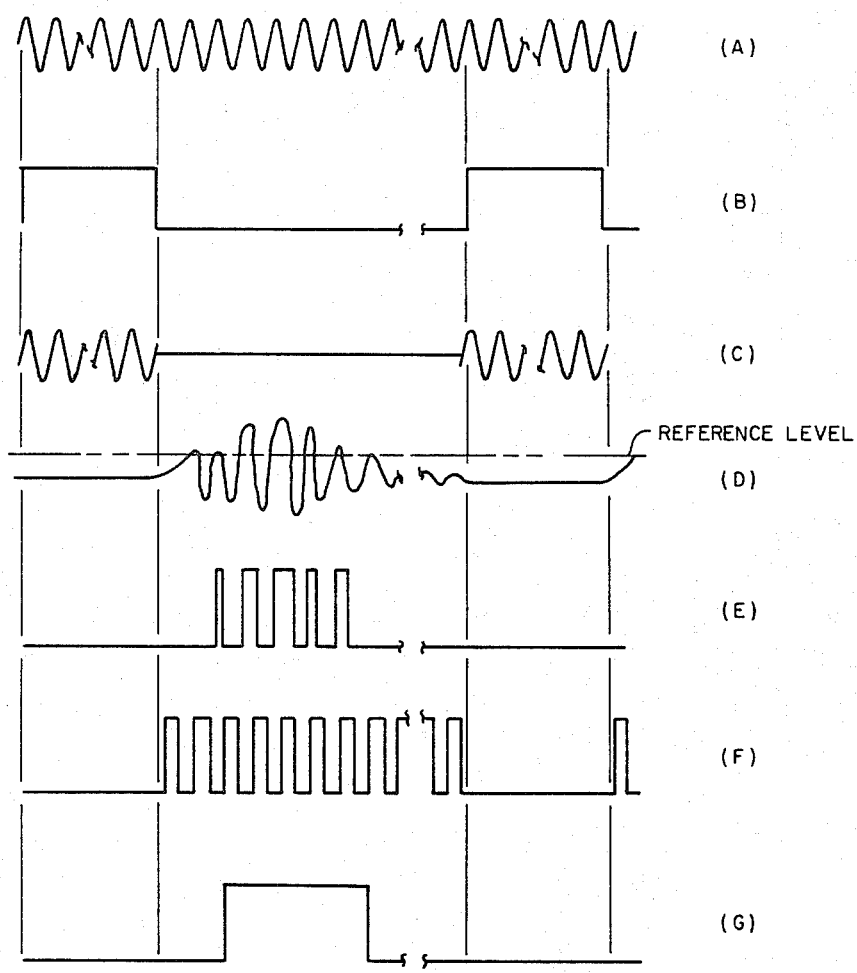
FIGS. 2A, 2G are timing/waveform diagrams of signals appearing at various points of the intrusion detector apparatus of FIG. 1, during the operation thereof.

Details of the operation and the method, according to the present invention, are explained in conjunction with FIGS. 1, and 2 as viewed concurrently.

The source of the transmitted signal(s) from the intrusion detector apparatus 10 is the sinusoidal oscillator 12 which is set to generate a sinusoidal signal nominally at a frequency of 20 kHz as shown in FIG. 2A. (Quasi-ultrasonic is used as a descriptive term here to highlight the fact that the frequency of transmission is not in the ultrasonic range, which is usually considered to be from 25 kHz to 50 kHz, but much lower). To continue, the pulse control unit 14 generates a plurality of pulses, as shown in FIGS. 2B, having an up-level for a period of 1.0 msec, which feeds one input of the transmit gate 16. The other input of the transmit gate 16 is fed by the sinusoidal signal from the sinusoidal oscillator 12. This gating action produces, at the output of the transmit gate 16, and, accordingly, at the input of the power amplifier 18, a 1.0 msec burst or pulse of 20 kHz signal as shown in FIG. 2C. As controlled by the pulse control unit 14, the foregoing signal is repeated at 1.0 second intervals. Power amplification of the signal takes place in the power amplifier 18, aforementioned, to provide sufficient power to drive the transducer 20. For purposes of the present invention the power amplifier 18 is a 50 watt device. Also, the transmit transducer 20 can comprise a plurality of high-frequency speakers arranged to form a wide propagation window of 180°. These high-frequency speakers can be of the horn-type having piezoelectric drivers. It should be mentioned that the driving power chosen for the transducer 20 depends on the size of the room to be secured. Also, since the output of the transducer 20 is a short energy burst at a frequency of 20 kHz, it is audible only as a dull click or pop, because the human ear can only detect its 1.0 msec envelope.

Still referring to FIGS. 1 and 2, as viewed concurrently, reflections of the foregoing signal(s) from the walls floor, ceiling of the room to be secured and objects disposed therein, i.e., the static room profile, form the received signal(s) or returned signal(s) 24. This signal(s), of course, is a composite signal having amplitude variations, due to the static room profile, that are sinusoidal variants of the transmitted signal(s) 22. The amplitude variation is due to the refections arriving back at the receive transducer 26 at various times. The signal(s) 24 is received by the receive transducer 26. For purposes of the present invention, the receive transducer 26 can also comprise a plurality of high-frequency speakers of the type previously mentioned disposed adjacent the transmit transducer 20 to form a wide receiving window of 180°. It should be clear from FIG. 1 and the foregoing discussion that a single transducer could be used with the pulse control unit 14 operating an electronic switch (not shown) to cause switching into a transmit or receive mode of operation. In a more elaborate scheme, sensitive microphones having flat frequency responses over most of the audio (20 to 15 kHz) and ultrasonic ranges can also be used for the receiver transducer 26. To continue, the electrical facsimile of the received signal(s) is amplified and filtered in the amplifier/band-pass filter 28 to increase its level and to remove most of the background noise as shown in FIG. 2D. In a typical situation, the band-pass filter portion of the amplifier/band-pass 28 has a center frequency of 20 kHz and a pass-band of 18 kHz to 22 kHz. After amplification and filtering, the signal(s) is thresholded in the threshold detector 30, according to a predetermined reference level presented at the reference input, to pass only the "useful peaks" of the conditioned signal above(s) the noise level. Thus, the output of the threshold detector 30 is a plurality of pulses whose widths vary as a function of the amplitude of the "useful peaks" above the threshold or reference level as shown in FIG. 2E.

Figure 3A:
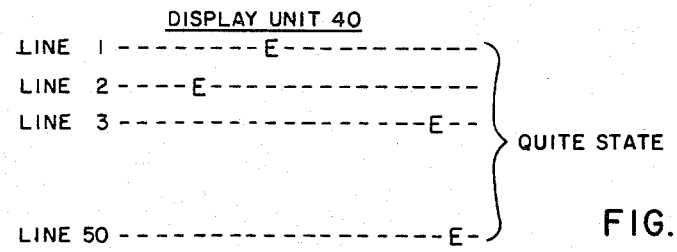
FIGS. 3A and 3B illustrate line displays on a display unit of the intrusion detector apparatus of FIG. 1, which depict errors and/or unauthorized entries, Es, respectively for the quiet state and the alarm state, according to the present invention.
Figure 3B:
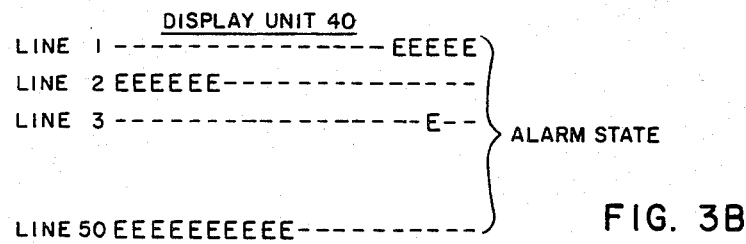

Referring also to FIGS. 3A and 3B, in actual practice, the "useful peak" standard is manifested in no more than one error, and/or unauthorized entry, E, per line, as displayed on the display unit 42 as illustrated in FIG. 3A. These plurality of pulses that vary in width as the amplitude of the "useful peaks" vary are fed to inputs of both the zero-crossing detector and the comparator 34. The zero-crossing detector 32 is also driven by the output of the sinusoidal oscillator 12. Accordingly, the output of the zero-crossing detector is a continuous square wave signal of 20 kHz that is locked-in to the signal in its input as shown in FIG. 2F. This continuous square wave signal drives the other input of the comparator 34 and operates as a clock for the microprocessor 36. The output of the comparator 34 is the actual input data to the microprocessor 36. When both inputs of the comparator 34 are at an up-level, its output is at an up-level as shown in FIG. 2G. This input data, i.e., for the quite state (see FIG. 3A), is stored in the microprocessor 36 for subsequent use according to the operational program stored in the EPROM 38. This operational program, of course can take many forms, but a simple and useful algorithm can be as follows and as illustrated in FIGS. 3A and 3B: let the line threshold be set at two, which means that two or more errors and/or unauthorized entry occurrences, Es, per line is an alarm condition that will not sound the alarm unit 44; and, let the number of lines threshold be set at three, which means that if the above condition is true for a time period of at least three consecutive lines, then there will be an alarm indication and the alarm unit 44 will sound. Notice in FIG. 3B that notwithstanding the substantial activity during the receive time frames of lines 1 and 2, line 3 does not indicate an alarm condition, therefore, the alarm unit 44 will not sound as would be the case for the operating conditions stated. The keyboard unit 40 is used to start operation of the intrusion detector apparatus 10, to interrupt it and to input data for test purposes and the like.

To those skilled in the art, many modification and variations of the present invention are possible in light of the above teachings. It is therefore to be understood that the present invention can be practiced otherwise than as specifically described herein and still be within the spirit and scope of the appended claims.

What is claimed is:

1. An intrusion detector apparatus for detecting an unauthorized entry in a room to be secured, comprising:
   means for transmitting for a predetermined period transmitted signal(s), said means for transmitting being configured to repeat transmitting of the transmitted signal(s) at a predetermined interval(s) following the predetermined period; and
   means for receiving received or return signal(s) during the predetermined interval in response to the transmitted signal(s) being reflecting from the walls, floor, ceiling or objects in the room to be secured, if present, said means for receiving including a microprocessor and being cofigured to detect, process and store a facsimile of the received signal(s) for the room to be secured when unoccupied, and then to continually compare facsimiles of subsequent received signal(s) therewith, according to a predetermined algorithm, so as to give a visual and/or audible indication of an unauthorized entry into the room to be secured, the predetermined algorithm operating to cause said microprocessor to indicate an alarm when there are two or more errors and/or unauthorized entry occurrences as determined by comparison between the stored facsimile and the current facsimile during at least three consecutive ones of the predetermined interval(s).

2. The intrusion detector apparatus of claim 1 wherein said means for transmitting comprises:
   a transmit gate having two inputs and an output;
   a sinusoidal oscillator operatively connected at its output to one input of said transmit gate, said sinusoidal oscillator being configured to generate a sinusoidal signal at a predetermined frequency at its output;
   a pulse control unit operatively connected to the other input of said transmit gate, said pulse control unit being configured to generate a plurality of pulses at the predetermined period and predetermined intervals following, so as to produce in coaction with said transmit gate and said sinusoidal oscillator, a gated sinusoidal signal at the output of said transmit gate;
   a power amplifier operatively connected at its input to the output of said transmit gate for amplifying the gated sinusoidal signal; and
   a transmit transducer operatively connected to the output of said power amplifier, said transmit transducer being configured to convert the amplified gated sinusoidal signal into the transmitted signal(s), in response to being driven with sufficient power by said power amplifier.

3. The intrusion detector apparatus of claim 2 wherein said means for receiving further comprises:
   a receive transducer for converting the received or return signal(s) into an electrical signal(s) facsimile thereof;
   an amplifier/band-pass filter operatively connected at its input to said receive transducer for amplifying and filtering the electrical signal(s) facsimile to remove most of the background noise therefrom to produce a conditioned signal(s);
   a threshold detector operatively connected at its signal input to the output of said amplifier/band-pass filter and operatively connected at its reference input to a predetermined reference level so as to generate a plurality of pulses at its output;
   a zero-crossing detector operatively connected at one input to said threshold detector and at its other input to the output of said sinusoidal oscillator and at its output to said microprocessor for producing thereat a continuous square wave signal at the predetermined frequency and locked-in to the plurality of pulses from said threshold detector, the continuous square wave signal operating as a clock for said microprocessor;
   a comparator operatively connected at one input to the output of said threshold detector and at its other input to the output of said zero-crossing detector for comparing the signal levels at its inputs such that when both inputs are at an up-level the output signal is at an up-level, the output of said comparator being operatively connected to said microprocessor to furnish actual input data thereto; and
   means operatively connected to said microprocessor for storing the predetermined algorithm therein.

4. The intrusion detector apparatus of claim 3 wherein said means for receiving further comprises a keyboard unit operatively connected to said microprocessor for starting operation of said intrusion detector apparatus, interrupting its operation and inputting data for test purposes.

5. The intrusion detector apparatus of claim 4 wherein said means for receiving further comprises:
   a display unit operatively connected to said microprocessor for displaying facsimiles of errors and/or unauthorized entries occuring during the predetermined interval(s); and
   an alarm unit operatively to said microprocessor for sounding an alarm signal when there is an unauthorized entry.

6. The intrusion detector apparatus of claim 3 wherein said receive transducer comprises a plurality of high-frequency speakers disposed adjacent said transmit transducer to form a wide receiving window of 180°.

7. The intrusion detector apparatus of claim 3 wherein the predetermined level is set such that the conditioned signal(s) is thresholded to pass only the useful peaks thereof above the noise level thereby producing the plurality of pulses so that they vary in width as the amplitude of the useful peaks vary.

8. The intrusion detector apparatus of claim 2 wherein the predetermined frequency, the predetermined period and the predetermined interval(s) are 20 kHz, 1.0 msec and 1.0 second, respectively.

9. The intrusion detector apparatus of claim 2 wherein said transmit transducer comprises a plurality of high-frequency speakers arranged to form a wide propagation window of 180°.

10. The intrusion detector apparatus of claim 9 wherein said plurality of high-frequency speakers are horn-type having piezoelectric drivers.

11. The intrusion detector apparatus of claim 9 wherein said plurality of high-frequency speaker comprising said receive transducer are horn-type having piezoelectric drivers.

* * * * *